Patented Jan. 25, 1949

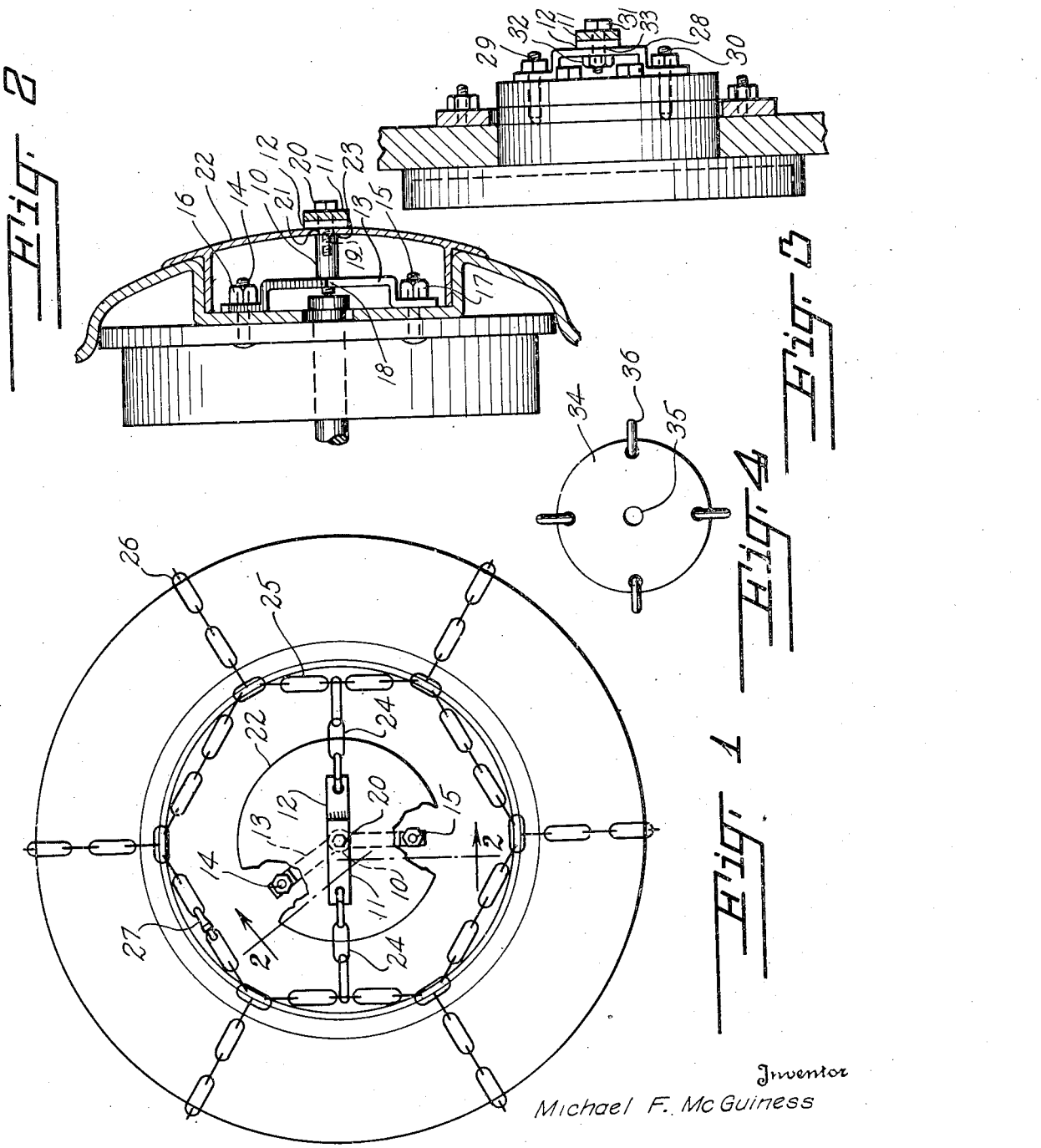

2,460,023

UNITED STATES PATENT OFFICE 2,460,023

ANTISKID TIRE CHAIN ANCHORING DEVICE

Michael F. McGuiness, Scranton, Pa., assignor of one-half to Allen J. Brandt, Scranton, Pa.

Application May 6, 1947, Serial No. 746,404

2 Claims. (Cl. 152—241)

This invention relates to anti-skid tire chains for motor vehicle wheels, and in particular a device for attaching anti-skid chains to wheels of motor vehicles through a fixed connection to the axle or wheel mounting, wherein the chains are continuously held in tension and cannot drop off or become lost should a chain or link therein break.

The object of the invention is to provide an attachment through which anti-skid chains may be secured to wheels of motor vehicles which hold the chain to a wheel until manually released.

Other features and advantages of the invention will appear from the following description taken in connection with the drawings, wherein:

Figure 1 is a view showing a side elevation of a wheel with an anti-skid chain thereon illustrating the attachment, with parts of the hub cap of the wheel broken away to show the mounting means of the attachment.

Figure 2 is an enlarged detail showing a section through the hub cap of the wheel illustrated in Figure 1, taken on line 2—2 of Figure 1, showing the chain-holding arms of the attachment positioned on the outer surface of the hub cap with the mounting bracket thereof mounted on the wheel bolt within the hub cap.

Figure 3 is a similar section illustrating the application of the device to wheels of trucks, buses, and comparatively heavy vehicles, wherein the device is mounted on the axle studs of the wheel mountings.

Figure 4 is a detail showing a modification, wherein the outer chain-holding arms are replaced by a disc with chain-holding links in the outer edge.

Referring now to the drawings, wherein like reference characters indicate corresponding parts, the anti-skid chain-anchoring device of this invention includes an anchoring stud 10, outer chain-holding elements 11 and 12, and an inner bracket 13.

In the design illustrated in Figures 1 and 2 in which an anchoring device for use on wheels of pleasure vehicles is shown, the bracket 13 is positioned in the hub cap and the ends are secured to wheel studs 14 and 15 by nuts 16 and 17. The usual wheels of pleasure vehicles are mounted through an odd number of studs and therefore the bracket is formed with two arms positioned at an obtuse angle with relation to each other. The bracket is provided with a threaded socket 18 which is positioned to receive the threaded end of the stud 10, as shown in Figure 2, and the outer ends of the arms are provided with openings that register with and receive the studs 14 and 15 of the wheel.

The outer end of the anchoring stud 10 is provided with a threaded socket 19 into which a cap screw 20 extending through an opening 21 in a hub cap 22 is screwed. The cap screw extends through openings in the inner ends of the elements 11 and 12, and the inner end is provided with a shoulder 23 to prevent binding the elements. The outer ends of the said elements are provided with chain links 24 by which the elements are attached to the circular side chain members 25 of an anti-skid tire chain having loop elements 26 and fasteners 27 in the circular side chain members. With the elements arranged in this manner, the anti-skid chain is permanently secured to the wheel structure, and should a chain come off of a wheel, or should a link break, at least one of the elements 24 will hold the chain to the wheel structure, and as the holding elements are pivotally mounted at the center of the wheel, the chains will drag behind the wheel and will not rotate therewith.

In the design shown in Figure 3, a mounting for truck and bus wheels is illustrated, wherein a bracket 28, similar to the bracket 13, is attached to the axle studs 29 and 30 of a wheel mounting, and the elements 11 and 12 are pivotally and directly mounted on the outer surface of the bracket by a bolt 31 having a nut 32 on the inner end and provided with a shoulder 33. In this type of wheel mounting, hub caps are not usually used, and instead of attaching the anchoring bracket to the wheel bolts, the bracket is mounted directly on the axle studs.

The device may be provided with any number of the elements 11 and 12, and in the device illustrated in Figure 4, the elements are replaced with a disc 34 having a centrally disposed opening 35 and provided with a plurality of radially extending links 36 which are freely mounted in the outer edge and positioned so that the circular side chain member 25 may be attached thereto, or to which independent anti-skid chain elements may be attached.

I claim:

1. The combination with a hub of a motor vehicle wheel, studs projecting from said hub, and a hub cap provided with a centrally-disposed opening for enclosing said hub, of a device for anchoring anti-skid chains including side chain members in position on said wheel, said device comprising a bracket provided with a threaded opening extending therethrough, adapted to be secured to said studs, said bracket embodying a pair of arms arranged at an obtuse angle with respect to each other, each of said arms being provided at its outer end with an opening, the openings in said arms being in engagement with said studs, an anchoring stud projecting through the opening in said hub cap and engaging the threaded opening in said bracket, and chain-holding elements carried by said anchoring stud and having their ends secured to said side chain members.

2. The combination with a hub of a motor vehicle wheel, studs projecting from said hub, and a hub cap provided with a centrally-disposed opening for enclosing said hub, of a device for anchoring anti-skid chains including side chain members in position on said wheel, said device comprising a bracket provided with a threaded opening extending therethrough, adapted to be secured to said studs, said bracket embodying a pair of arms arranged at an obtuse angle with respect to each other, each of said arms being provided at its outer end with an opening, the openings in said arms being in engagement with said studs, an anchoring stud projecting through the opening in said hub cap and engaging the threaded opening in said bracket, said anchoring stud being provided at its outer end with a threaded socket, a cap screw in threaded engagement with said socket, and chain-holding elements carried by said anchoring stud and having their ends secured to said side chain members.

MICHAEL F. McGUINESS.

REFERENCES CITED

The following references are of record in the file of this patent:

UNITED STATES PATENTS

| Number | Name | Date |
|---|---|---|
| 1,243,711 | Christy et al. | Oct. 23, 1917 |
| 1,455,409 | Poli | May 15, 1923 |
| 1,472,448 | Weaver | Oct. 30, 1923 |